(12) United States Patent  
Sun et al.

(10) Patent No.: US 8,163,185 B1
(45) Date of Patent: Apr. 24, 2012

(54) METHOD AND APPARATUS FOR LIFTING OFF PHOTORESIST BENEATH AN OVERLAYER

(75) Inventors: Hai Sun, Milpitas, CA (US); Liubo Hong, San Jose, CA (US); Rowena Schmidt, Gilroy, CA (US); Lijie Zhao, Pleasanton, CA (US); Winnie Yu, San Jose, CA (US); Hongping Yuan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 1059 days.

(21) Appl. No.: 12/059,903

(22) Filed: Mar. 31, 2008

(51) Int. Cl.
*B44C 1/22* (2006.01)

(52) U.S. Cl. ............... 216/22; 216/40; 216/57; 216/66; 29/603.07

(58) Field of Classification Search .................. None
See application file for complete search history.

(56) References Cited

U.S. PATENT DOCUMENTS

| | | | |
|---|---|---|---|
| 3,914,464 A * | 10/1975 | Thomasson et al. | 430/321 |
| 3,922,774 A * | 12/1975 | Lindmayer et al. | 438/72 |
| 3,949,463 A * | 4/1976 | Lindmayer et al. | 438/72 |
| 4,179,312 A * | 12/1979 | Keller et al. | 117/9 |
| 4,293,624 A * | 10/1981 | Buckley | 430/5 |
| 4,428,761 A * | 1/1984 | Howard et al. | 65/421 |
| 4,432,134 A * | 2/1984 | Jones et al. | 216/3 |
| 4,496,648 A * | 1/1985 | Young | 430/312 |
| 4,592,801 A * | 6/1986 | Hara et al. | 216/22 |
| 4,679,303 A * | 7/1987 | Chen et al. | 438/289 |
| 5,087,332 A | 2/1992 | Chen | |
| 5,243,252 A * | 9/1993 | Kaneko et al. | 313/309 |
| 5,654,128 A | 8/1997 | Hsu | |
| 5,897,969 A * | 4/1999 | Taniyama et al. | 428/833 |
| 6,218,056 B1 | 4/2001 | Pinarbasi et al. | |
| 6,434,814 B1 | 8/2002 | Chang et al. | |
| 6,493,926 B2 | 12/2002 | Han et al. | |
| 6,713,237 B2 | 3/2004 | Seigler | |
| 6,861,177 B2 | 3/2005 | Pinarbasi et al. | |
| 7,007,374 B2 | 3/2006 | Lille | |
| 7,194,797 B2 | 3/2007 | Pinarbasi | |
| 7,211,195 B2 | 5/2007 | Cyrille | |
| 2003/0015494 A1 | 1/2003 | Jayashankar et al. | |
| 2003/0182790 A1 | 10/2003 | Hsiao et al. | |
| 2004/0057163 A1 | 3/2004 | Lin | |
| 2004/0160700 A1 | 8/2004 | Giannantonio et al. | |
| 2005/0041341 A1 | 2/2005 | Cyrille et al. | |
| 2006/0213053 A1 | 9/2006 | Dugas et al. | |
| 2006/0291097 A1 | 12/2006 | Honda et al. | |
| 2008/0274623 A1* | 11/2008 | Guthrie et al. | 438/712 |
| 2010/0024201 A1* | 2/2010 | Le et al. | 29/603.14 |

* cited by examiner

Primary Examiner — Allan Olsen

(57) ABSTRACT

A method of lifting off photoresist beneath an overlayer includes providing a structure including photoresist and depositing an overlayer impenetrable to a liftoff solution over the photoresist and a field region around the structure. The method also includes forming a mask over the structure and ion milling to remove the overlayer in the field region not covered by the mask. The method then includes lifting off the photoresist using the liftoff solution.

10 Claims, 2 Drawing Sheets

METHOD AND APPARATUS FOR LIFTING OFF PHOTORESIST BENEATH AN OVERLAYER

BACKGROUND

Photoresist layers are commonly used in the formation of particular structures on a wafer. In a typical manufacturing process using photoresist, there may be a number of steps involving deposition of layers, ion milling, etching, and numerous other processes. In particular, the use of photoresist layers to manufacture read and/or write heads for hard disk drives may involve the formation of tiny, three-dimensional structures using photoresist. In the complicated operations used to form such structures, photoresist layers can become embedded underneath other layers deposited during formation of these structures. The deposition process may thus leave the photoresist layer covered by an overlayer that is more or less impenetrable by the liftoff solution. Accordingly, the conventional techniques for lifting off photoresist using a liftoff solution might not be successful. Sometimes other process techniques can be used to allow the liftoff solution to penetrate an upper layer, including, for example, undercutting photoresist structures. But those techniques may introduce additional complexity into the manufacturing process, which can be undesirable for a number of reasons, including difficulties in controlling the additional process steps, requirement of additional time and expense, and other associated complications.

SUMMARY

In particular embodiments, a method of lifting off photoresist beneath an overlayer includes providing a structure including photoresist and depositing an overlayer impenetrable to a liftoff solution over the photoresist and a field region around the structure. The method also includes forming a mask over the structure and ion milling to remove the overlayer in the field region not covered by the mask. The method then includes lifting off the photoresist using the liftoff solution. In some embodiments, the structure may be a magnetoresistive sensor and the overlayer may be a hard bias and/or capping layer for the hard bias. In other embodiments, the structure may be a write pole for a perpendicular magnetic recording (PMR) write head. In certain embodiments, the mask may include photoresist. Particular embodiments of the mask may have a thickness between 0.2 and 2 mm and a width more than $10^3$ times a width of the structure.

DETAILED DESCRIPTION OF THE PREFERRED EMBODIMENTS

Figure 1:
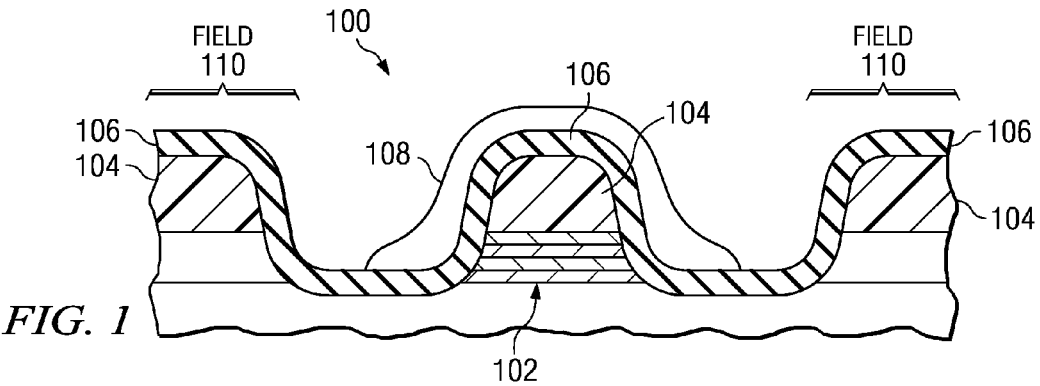
FIG. 1 illustrates a sensor for a hard disk drive manufactured according to a particular embodiment of the present invention before ion milling a field region.

FIG. 1 illustrates a magnetoresistive sensor 100 being manufactured according to a particular embodiment of the present invention. The illustrated features are not shown to scale; certain figures have been magnified for ease of illustrating the relationship between the various parts being described. The sensor 100 includes a sensor stack 102 with a photoresist layer 104 atop the sensor stack 102. Some distance away, which may be a few microns in a particular embodiment, from the sensor stack 102, there is a field region 110 also covered with photoresist 104. The sensor stack 102 and photoresist layer 104 are in turn covered by an overlayer 106 that effectively seals in the photoresist layer 104 both near the sensor stack 102 and the field region 110, so that liftoff solution would be substantially prevented from reaching the photoresist layer 104. For example, the overlayer 106 can be formed from the material used for the magnetic hard bias for the sensor 100. In particular embodiments, the overlayer 106 may also include a capping layer for the hard bias. The sensor 100, which is not shown to scale, is only an example for illustrative purposes, and it should be understood that in addition to magnetoresistive sensors, the described techniques can be applied to any suitable structure formed using a photoresist layer 104 with an overlayer 106 substantially preventing the liftoff solution from reaching the photoresist layer 104. For example, in particular embodiments, the structure might be a write pole for a perpendicular magnetic recording (PMR) write head. In particular embodiments, the liftoff solution may be N-methylpyrrolidone (NMP).

According to a particular embodiment, a mask 108 resistant to an ion milling process is deposited over the sensor 100. The mask 108 may also be made of photoresist, for example, or any other suitable material resistant to an ion milling process for removing the material of the overcoat 106. The mask 108 may also have a thickness selected such that when the overcoat 106 is milled away, at least some thickness of the mask 108 will remain to protect the sensor stack 102 from being damaged. In particular embodiments, the mask 108 has a thickness between 0.2 and 2 µm, but it should be understood that this can vary significantly depending on the particular tools, materials, and processes for depositing and milling layers.

Figure 2:
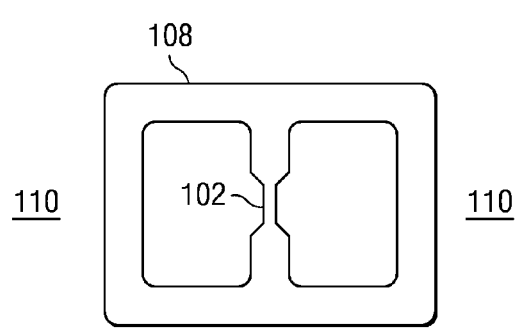
FIG. 2 is a top view of the sensor illustrated in FIG. 1.

The mask 108 may advantageously have a significantly larger width than the sensor stack 102 so that the deposition process used to control the overlay of the mask 108 on the sensor stack 102 need not be as precise as the processes for depositing the photoresist 104 used to form the sensor stack 102. Thus, for example, if the overlay of the photoresist deposition process used to form the sensor stack 102 might be controllable to within 10 nanometers, a suitably large mask 108 could be accurately placed even if the overlay were controllable only to within 5 microns or more. The top view in FIG. 2 shows an example in which the size of the mask 108 is significantly larger than the region of the sensor stack 102. FIG. 2 shows the area covered by the mask 108 relative to the surrounding field 110. The mask 108 is shown as a transparent window so that the width of the sensor stack 102 beneath the mask 108 is visible for comparison, but the actual material of the mask 108 need not be transparent. The width of a sensor stack 102 might be, for example, less than 100 nm, while the mask might be more than 1,000 times wider.

Figure 3:
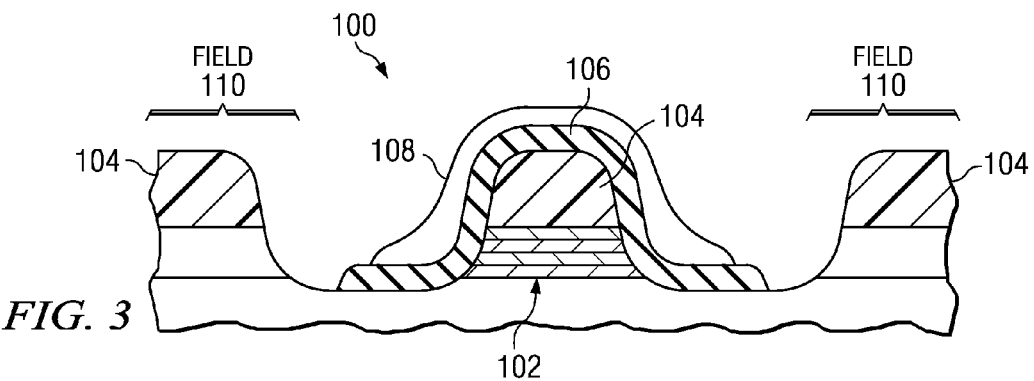
FIG. 3 illustrates a sensor for a hard disk drive manufactured according to a particular embodiment of the present invention after ion milling a field region.

With the mask 108 over the sensor stack 102, the field region 110 may then be milled to remove the overlayer 106 as illustrated in FIG. 3. Once the overlayer 106 has been removed, the liftoff solution can penetrate beneath the overlayer 106 over the sensor stack 102 to remove the photoresist 104. Increased temperature and ultrasonic vibrations may also be used to facilitate liftoff, and subsequent process steps, such as chemical-mechanical polishing (CMP), may also be used to remove any residual photoresist 104 that might remain after liftoff.

Figure 3A:
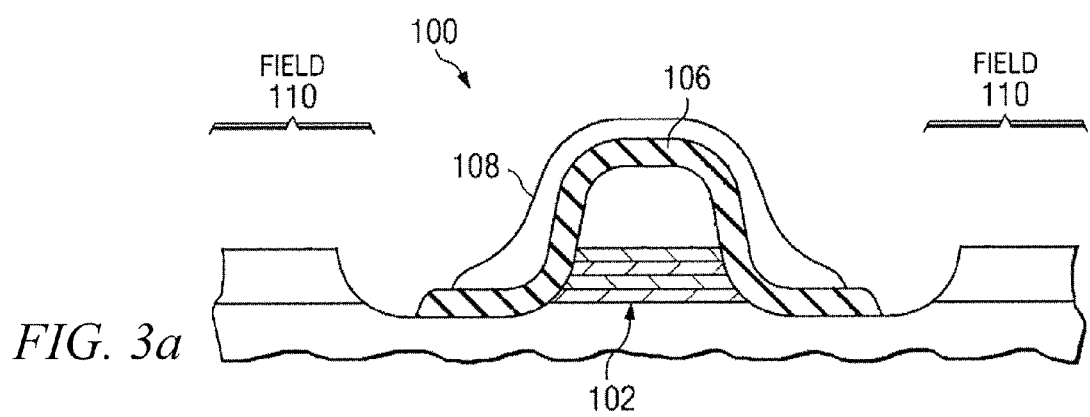
FIG. 3a illustrates the sensor of FIG. 3 after the photoresist has been lifted off according to a particular embodiment of the present invention.

FIG. 3a illustrates the sensor of FIG. 3 after the photoresist has been lifted off according to a particular embodiment of the present invention.

Figure 4:
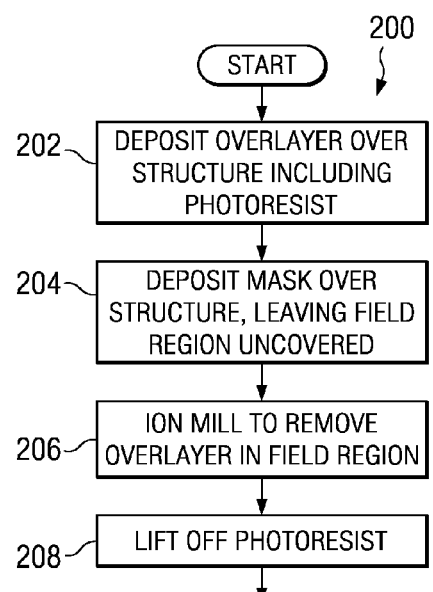
FIG. 4 is a flow chart illustrating a method for lifting off photoresist according to another embodiment of the present invention.

FIG. 4 is a flow chart showing an example method 200 for lifting off photoresist 104 beneath an overlayer 106. At step 202, an overlayer 106 that is impenetrable to a liftoff solution is deposited over a structure including photoresist 104. At step 204, a mask 108 is deposited over the structure, leaving a field region 110 uncovered. At step 206, an ion mill is performed to remove the overlayer 106 in the field region 110 not protected by the mask 108. At step 208, after the overlayer 106 has been removed, the photoresist 104 is lifted off using a liftoff solution. Residual photoresist 104 may optionally be removed using later process steps.

What is claimed is:

1. A method of lifting off photoresist beneath an overlayer, comprising:
   providing a structure including photoresist,
   depositing an overlayer impenetrable to a liftoff solution over the photoresist and a field region around the structure;
   forming a mask over the structure;
   ion milling to remove the overlayer in the field region not covered by the mask; and
   lifting off the photoresist using the liftoff solution.

2. The method of claim 1, wherein the structure is a write pole for a perpendicular magnetic recording (PMR) write head.

3. The method of claim 1, wherein the mask comprises photoresist.

4. The method of claim 1, wherein the mask has a thickness between 0.2 and 2 μm.

5. The method of claim 1, wherein the structure has a width less than 100 nm.

6. The method of claim 5, wherein the mask has a width at least $10^3$ times larger than the width of the structure.

7. The method of claim 1, wherein the structure includes a magnetoresistive sensor stack.

8. The method of claim 7, wherein a width of the mask is significantly larger than a width of the magnetoresistive sensor stack.

9. The method of claim 7, wherein the overlayer comprises a hard bias material for the magnetoresistive sensor stack.

10. The method of claim 4, wherein the overlayer further comprises a capping layer for the hard bias.

* * * * *